(12) United States Patent
Hara et al.

(10) Patent No.: US 8,854,838 B2
(45) Date of Patent: Oct. 7, 2014

(54) POWER SUPPLY CONTROL DEVICE, POWER SUPPLY SYSTEM AND ELETRONIC DEVICE

(75) Inventors: Hideo Hara, Kyoto (JP); Hiroaki Goda, Kyoto (JP); Takashi Naiki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 322 days.

(21) Appl. No.: 13/378,085

(22) PCT Filed: Jul. 1, 2010

(86) PCT No.: PCT/JP2010/061261
§ 371 (c)(1),
(2), (4) Date: Dec. 14, 2011

(87) PCT Pub. No.: WO2011/002062
PCT Pub. Date: Jan. 6, 2011

(65) Prior Publication Data
US 2012/0092897 A1    Apr. 19, 2012

(30) Foreign Application Priority Data

Jul. 2, 2009   (JP) ................................. 2009-157811

(51) Int. Cl.
*H02M 3/335*   (2006.01)
*H02J 9/00*   (2006.01)
*H02M 1/00*   (2006.01)

(52) U.S. Cl.
CPC ............... *H02J 9/005* (2013.01); *Y02B 70/16* (2013.01); *H02M 2001/0032* (2013.01)
USPC ......................................... 363/16; 363/21.01

(58) Field of Classification Search
USPC ............. 323/15, 16, 20, 21.01, 34, 56.09, 97, 323/108; 363/15, 16, 20, 21.01, 34, 56.09, 363/97, 108
See application file for complete search history.

(56) References Cited

U.S. PATENT DOCUMENTS

| | | | |
|---|---|---|---|
| 6,316,844 | B1 | 11/2001 | Arima |
| 6,947,296 | B2 * | 9/2005 | Hirosawa ........................ 363/20 |
| 2004/0052092 | A1 | 3/2004 | Hirosawa |
| 2006/0038512 | A1 | 2/2006 | Tani |

FOREIGN PATENT DOCUMENTS

| | | |
|---|---|---|
| JP | 11-299092 | 10/1999 |
| JP | 2000-341940 | 12/2000 |
| JP | 2004-23894 | 1/2004 |
| JP | 2005-295632 | 10/2005 |
| JP | 2006-060968 | 3/2006 |

* cited by examiner

*Primary Examiner* — Adolf Berhane
*Assistant Examiner* — Yemane Mehari
(74) *Attorney, Agent, or Firm* — Fish & Richardson P.C.

(57) ABSTRACT

An electronic device includes a power supply system and a load circuit connected to the power supply system. The load circuit mutually switches between the first mode and the second mode. In the first mode, the load circuit operates with electric power supplied from the power supply system. On the other hand, in the second mode, the load circuit is brought into the state where the electric power does not need to be supplied from the power supply system. In response to the fact that the mode of the load circuit is switched from the first mode to the second mode, a power supply control device causes an AC/DC converter to stop.

5 Claims, 9 Drawing Sheets

POWER SUPPLY CONTROL DEVICE, POWER SUPPLY SYSTEM AND ELETRONIC DEVICE

TECHNICAL FIELD

The present invention relates to a power supply control device, a power supply system and an electronic device. The present invention particularly relates to a power supply control device for reducing loss of a power supply, a power supply system provided with the power supply control device, and an electronic device provided with the power supply system.

BACKGROUND ART

An electronic device generally has a power supply for driving a load circuit. In recent years, many electronic devices (typically, a television receiver) each include a main power supply circuit supplying a power supply voltage to each part of the device body, and a standby power supply circuit for operating a light-receiving circuit, a microcomputer (hereinafter also referred to as a mi-con) or the like of a remote controller.

The standby power supply circuit supplies a power supply voltage to the light-receiving circuit, the microcomputer or the like of the remote controller even when a main power supply circuit is in the OFF state. For example, when the remote controller instructs the light-receiving circuit to turn the power on, the main power supply circuit is operated under control of the microcomputer. On the other hand, when the remote controller instructs the light-receiving circuit to turn the power off, the main power supply circuit is stopped under control of the microcomputer. When the electronic device is in the standby mode, the device body consumes less power. When the main power supply circuit is stopped, the loss of the main power supply circuit is suppressed. This allows a reduction in the standby power of the electronic device.

For example, Japanese Patent Laying-Open No. 2004-23894 (Patent Literature 1) discloses an electronic device provided with a main power supply circuit and a standby power supply circuit. The standby power supply circuit is configured of a switching power supply. This switching power supply includes means for detecting a surge voltage generated at the time when AC power is turned on. When this detection means detects a surge voltage, a switching control circuit inhibits the operation of a MOSFET (Metal Oxide Semiconductor Field Effect Transistor) serving as a switching element.

CITATION LIST

Patent Literature

PTL 1: Japanese Patent Laying-Open No. 2004-23894

SUMMARY OF INVENTION

Technical Problem

As described above, the standby power supply circuit allows a reduction in the power consumption of the electronic device at the time when the electronic device is in the standby mode. However, the consumed power of the electronic device during the operation of the standby power supply circuit includes loss of the standby power supply circuit. In order to reduce the power consumption during the time while the electronic device is in the standby mode, it is preferable to reduce the loss of the standby power supply circuit. Patent Literature 1, however, does not specifically describe the problem regarding such loss of the power supply.

An object of the present invention is to provide a power supply control device for allowing a reduction in loss of the power supply in the state where a load circuit consumes less power, a power supply system provided with the power supply control device, and an electronic device.

Solution to Problem

According to one aspect, the present invention provides a power supply control device for controlling a power supply of a load circuit. The load circuit is capable of mutually switching between a first state in which electric power needs to be supplied from the power supply and a second state in which electric power does not need to be supplied from the power supply. The power supply control device includes a determination unit for determining a change of a state of the load circuit between the first state and the second state; and a control unit for causing the power supply to stop when the determination unit determines that the first state is changed to the second state.

Preferably, the control unit starts up the power supply for supplying the electric power to the load circuit when the determination unit determines that the second state is changed to the first state.

Preferably, the power supply has a node to which a power storage device and the power supply control device are connected in common. The power supply control device receives electric power from the node. After the power supply is stopped due to the change of the load circuit from the first state to the second state, the control unit intermittently starts the power supply in order to resupply the electric power to the power storage device.

Preferably, the power supply control device controls an operation time period of the power supply at a time when the power supply is intermittently started such that a voltage of the node is greater than a lower limit value in a range of an operating voltage of the power supply control device and equal to or less than a voltage of the power storage device in a fully charged state.

According to another aspect, the present invention provides a power supply system including a power supply for supplying electric power to a load circuit. The load circuit is capable of mutually switching between a first state in which electric power needs to be supplied from the power supply and a second state in which electric power does not need to be supplied from the power supply. The power supply system further includes a power supply control device for controlling the power supply. The power supply control device includes a determination unit for determining a change of a state of the load circuit between the first state and the second state, and a control unit for causing the power supply to stop when the determination unit determines that the first state is changed to the second state.

According to still another aspect, the present invention provides an electronic device including a power supply; a load circuit; and a power supply control device for controlling the power supply. The load circuit is configured to be capable of mutually switching between a first state in which electric power needs to be supplied from the power supply and a second state in which electric power does not need to be supplied from the power supply. The power supply control device includes a determination unit for determining a change of a state of the load circuit between the first state and the second state, and a control unit for causing the power supply to stop when the determination unit determines that the first state is changed to the second state.

Advantageous Effects of Invention

According to the present invention, the loss of the power supply itself can be reduced when the electronic device body (a load circuit) consumes less electric power.

DESCRIPTION OF EMBODIMENTS

The embodiments of the present invention will be hereinafter described in detail with reference to the accompanying drawings, in which the same or corresponding components are designated by the same reference characters, and description thereof will not be repeated.

Figure 1:
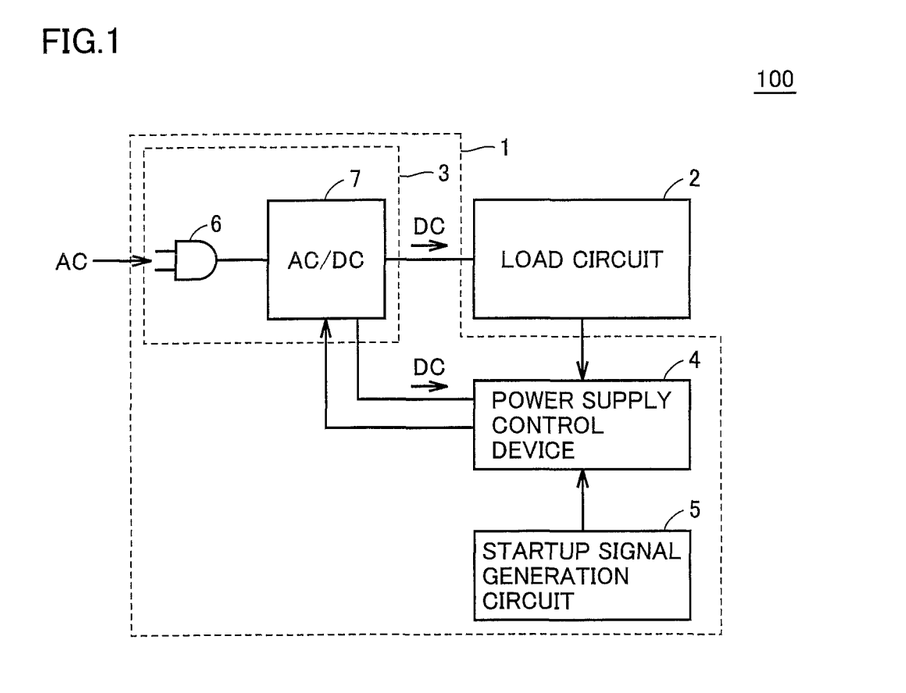
FIG. 1 is a block diagram conceptually showing the configuration of an electronic device including a power supply system according to an embodiment of the present invention.

FIG. 1 is a block diagram conceptually showing the configuration of an electronic device including a power supply system according to an embodiment of the present invention.

Referring to FIG. 1, an electronic device 100 includes a power supply system 1 and a load circuit 2 connected to power supply system 1. Load circuit 2 mutually switches between the first mode and the second mode. In the first mode, load circuit 2 operates with the electric power supplied from power supply system 1. The first mode will be hereinafter also referred to as a "normal operation mode".

In contrast, in the second mode, load circuit 2 is brought into the state where electric power does not need to be supplied from power supply system 1. For example, load circuit 2 is brought into the standby state in the second mode while continuing to operate by the electric power supplied from another power supply (for example, a power storage device) which is not shown in FIG. 1. The second mode will be hereinafter also referred to as a "standby mode". It is to be noted that load circuit 2 may stop its operation in the second mode.

Power supply system 1 includes a power supply 3, a power supply control device 4, and a startup signal generation circuit 5. Power supply 3 includes a plug 6 connected to a receptacle for receiving alternating-current (AC) power, and an AC/DC converter 7 for converting the AC power input through plug 6 into direct-current (DC) power. The DC power generated by AC/DC converter 7 is supplied to load circuit 2 and power supply control device 4.

In response to the fact that the mode of load circuit 2 is switched from the first mode to the second mode, power supply control device 4 causes AC/DC converter 7 to stop. In addition, power supply control device 4 causes AC/DC converter 7 to start in response to the startup signal from startup signal generation circuit 5. The startup signal serves to switch the mode of load circuit 2 from the second mode to the first mode.

While load circuit 2 is in the second mode, power supply control device 4 continues its operation using the electric power stored in the power storage device which is not shown. Power supply control device 4 intermittently starts AC/DC converter 7 in order to resupply the electric power to the power storage device, as will be described later.

Figure 2:
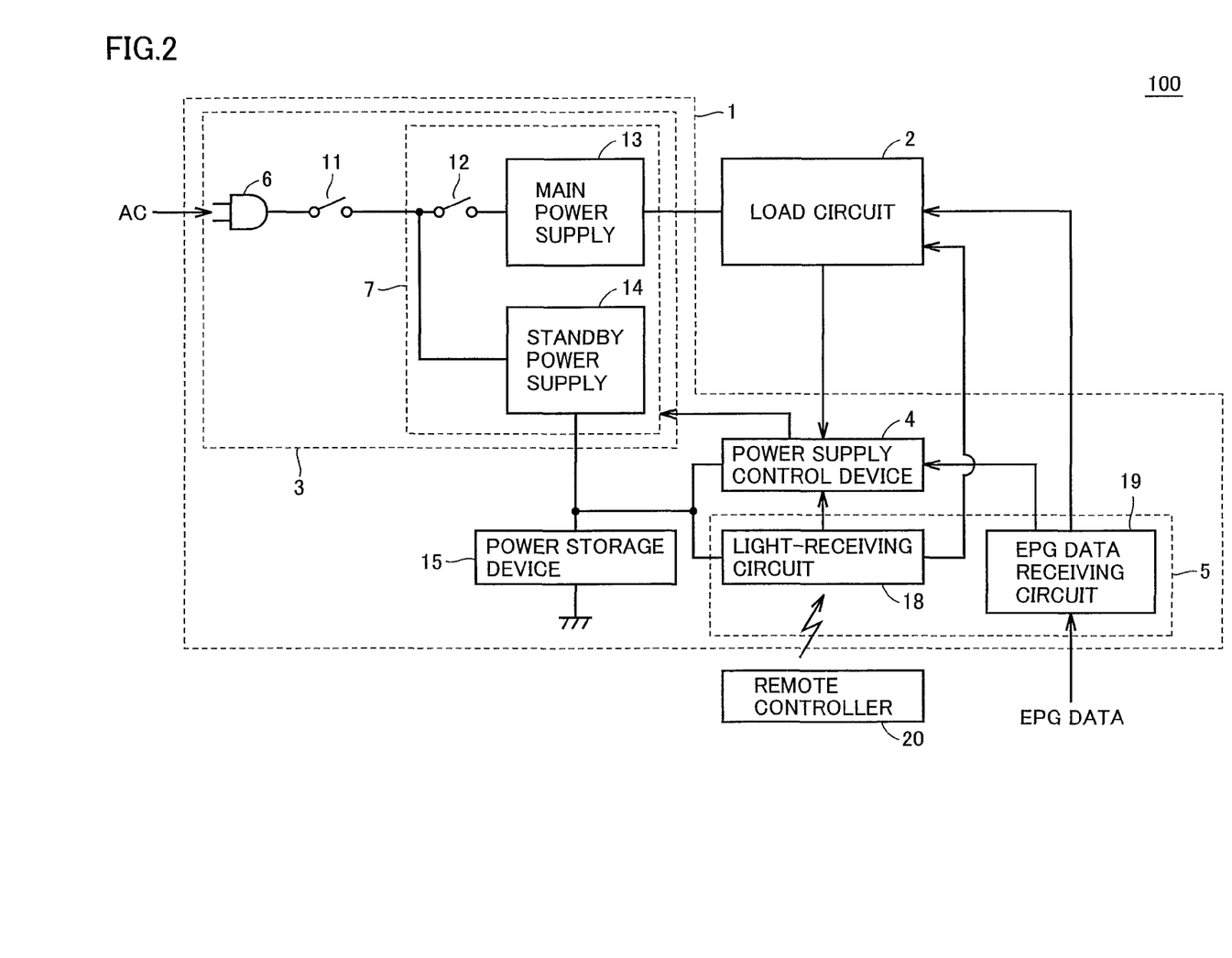
FIG. 2 is a block diagram showing a more specific configuration example of an electronic device 100 shown in FIG. 1.

FIG. 2 is a block diagram showing a more specific configuration example of electronic device 100 shown in FIG. 1. Referring to FIG. 2, electronic device 100 is a television receiver. Load circuit 2 includes a display circuit for displaying an image, a reproduction circuit for reproducing sound, a standby circuit (a microcomputer, a clock and the like) controlling the operation of load circuit 2 at the time when the television receiver is in the standby mode, and the like.

Power supply 3 includes a plug 6, a mechanical switch 11, AC/DC converter 7, power supply control device 4, startup signal generation circuit 5, and a power storage device 15. AC/DC converter 7 includes a main power supply switch 12, a main power supply 13 and a standby power supply 14.

Mechanical switch 11 functions as a switch for supplying AC power (for example, AC 100V) from a commercial power supply to AC/DC converter 7 or for stopping supplying the AC power to AC/DC converter 7. Main power supply switch 12 is provided, for example, at the front stage of main power supply 13. It is to be noted that main power supply switch 12 may be incorporated in main power supply 13.

In the present embodiment, main power supply switch 12 is assumed to be controlled by power supply control device 4. When main power supply switch 12 is turned on, main power supply 13 converts the AC power into DC power. For example, main power supply 13 may be configured of a switching power supply or may be a rectifier circuit configured of a diode bridge and a smoothing capacitor.

Load circuit 2 operates in the normal operation mode with the electric power supplied from main power supply 13.

Startup signal generation circuit 5 includes a light-receiving circuit 18 for receiving a light signal (infrared signal) from a remote controller 20, and an EPG data receiving circuit 19 for receiving the EPG (Electric Program Guide) data transmitted via airwaves and the like. EPG data receiving circuit 19 transmits the EPG data to load circuit 2.

Light-receiving circuit 18 receives a power-off signal transmitted from remote controller 20 and transmits the power-off signal to load circuit 2. In response to the signal from light-receiving circuit 18, load circuit 2 changes its state from the normal operation mode (the above-described first mode) to the standby mode (the above-described second mode) and also transmits, to power supply control device 4, the signal indicating that load circuit 2 is shifted to the standby mode. In response to the signal from load circuit 2, power supply control device 4 causes main power supply switch 12 to turn off and also causes standby power supply 14 to stop.

When main power supply switch 12 is turned off, main power supply 13 is stopped. After the operation of standby power supply 14 is stopped, power supply control device 4 and startup signal generation circuit 5 operate with the electric power stored in power storage device 15. It is to be noted that power storage device 15 may supply the electric power to the standby circuit included in load circuit 2.

Power storage device 15 is configured of a storage battery or a capacitor, for example. It is, however, to be noted that the type of power storage device 15 is not particularly limited as long as this power storage device 15 is configured to be chargeable and dischargeable. The operation of each of power supply control device 4 and startup signal generation circuit 5 causes a gradual reduction of the electric power stored in power storage device 15. Power supply control device 4 starts only standby power supply 14 in order to resupply electric power to power storage device 15.

Standby power supply 14 converts the AC power input through plug 6 and mechanical switch 11 into DC power and also outputs the electric power. This causes power storage device 15 to be charged. Upon completion of charging of power storage device 15, power supply control device 4 causes standby power supply 14 to stop again. While load circuit 2 is in the second mode, power supply control device 4 repeatedly starts and stops standby power supply 14. In other words, power supply control device 4 intermittently starts standby power supply 14.

When light-receiving circuit 18 receives a power-on signal from remote controller 20 or when EPG data receiving circuit 19 receives the EPG data, power supply control device 4 responds to the power-on signal from light-receiving circuit 18 or the startup signal from EPG data receiving circuit 19, to turn on main power supply switch 12 and also start standby power supply 14.

Standby power supply 14 only needs to be configured such that it is started and stopped by power supply control device 4. Therefore, the configuration of standby power supply 14 is not particularly limited. Standby power supply 14 is configured of a switching power supply, for example.

Figure 3:
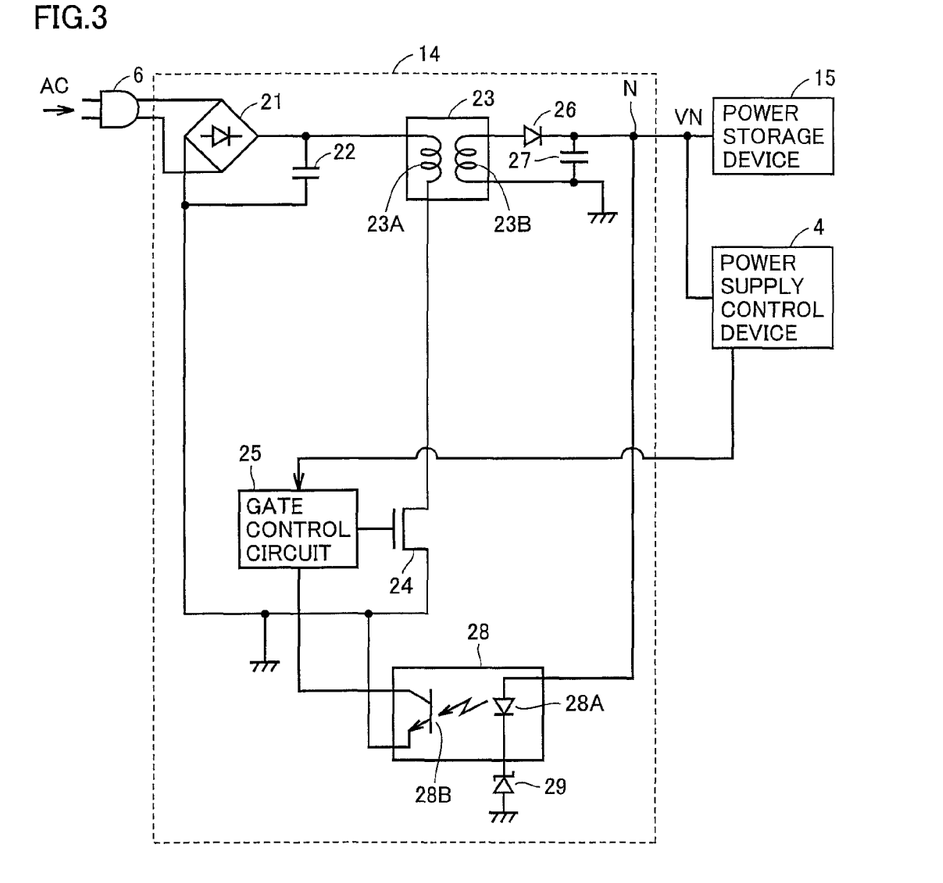
FIG. 3 is a circuit diagram showing one configuration example of a standby power supply 14 shown in FIG. 2.

FIG. 3 is a circuit diagram showing one configuration example of standby power supply 14 shown in FIG. 2. Referring to FIG. 3, standby power supply 14 includes a rectifier circuit 21, a smoothing capacitor 22, a transformer 23, a MOSFET 24, a gate control circuit 25, a diode 26, a smoothing capacitor 27, a photo coupler 28, and a zener diode 29. Rectifier circuit 21 rectifies the AC voltage supplied through plug 6 from the commercial power supply. Smoothing capacitor 22 smoothes the fluctuation component of the DC voltage output from rectifier circuit 21.

Transformer 23 includes a primary winding 23A and a secondary winding 23B. Primary winding 23A has one end to which a DC voltage smoothed by smoothing capacitor 22 is input. MOSFET 24 is connected between the other end of primary winding 23A of transformer 23 and a ground node. Gate control circuit 25 controls the gate voltage of MOSFET 24 to thereby control the switching operation of MOSFET 24.

Gate control circuit 25 outputs the signal for controlling the switching operation of MOSFET 24. For example, gate control circuit 25 generates a pulse signal in accordance with the PWM (pulse width modulation) scheme, and then, outputs the pulse signal to the gate of MOSFET 24. MOSFET 24 is turned on and off in response to the signal from gate control circuit 25. This causes generation of an AC voltage on secondary winding 23B of transformer 23. This voltage is rectified by diode 26 and smoothed by smoothing capacitor 27. Consequently, standby power supply 14 outputs a voltage VN from a node N. Power storage device 15 and power supply control device 4 are connected to this node N. Voltage VN is supplied to power storage device 15 and power supply control device 4 and also supplied to other circuits such as startup signal generation circuit 5.

Photo coupler 28 operates with the voltage on the secondary side of transformer 23. Photo coupler 28 forms a feedback circuit that provides a feedback signal from the secondary side of transformer 23 to the primary side thereof. Diode 26 has a cathode connected to the anode of a light emitting diode 28A. Light emitting diode 28A has a cathode that is grounded through zener diode 29. A phototransistor 28B has a collector connected to gate control circuit 25. The emitter of phototransistor 28B is grounded.

When voltage VN is increased above the prescribed voltage specified by zener diode 29, light emitting diode 28A is turned on. When light emitting diode 28A is turned on, light is emitted from light emitting diode 28A. Phototransistor 28B is turned on in response to the light emitted from light emitting diode 28A. When phototransistor 28B is turned on, gate control circuit 25 operates so as to lower voltage VN. For example, gate control circuit 25 lowers the frequency of the signal supplied to the gate of MOSFET 24. Alternatively, gate control circuit 25 shortens the ON time period of MOSFET 24.

On the other hand, when VN is decreased, light emitting diode 28A stops emitting light. When light emitting diode 28A stops emitting light, phototransistor 28B is turned off. In this case, gate control circuit 25 operates so as to raise voltage VN. For example, gate control circuit 25 controls MOSFET 24 such that the switching frequency of MOSFET 24 is increased. Voltage VN is kept almost constant by the above-described control.

Figure 4:
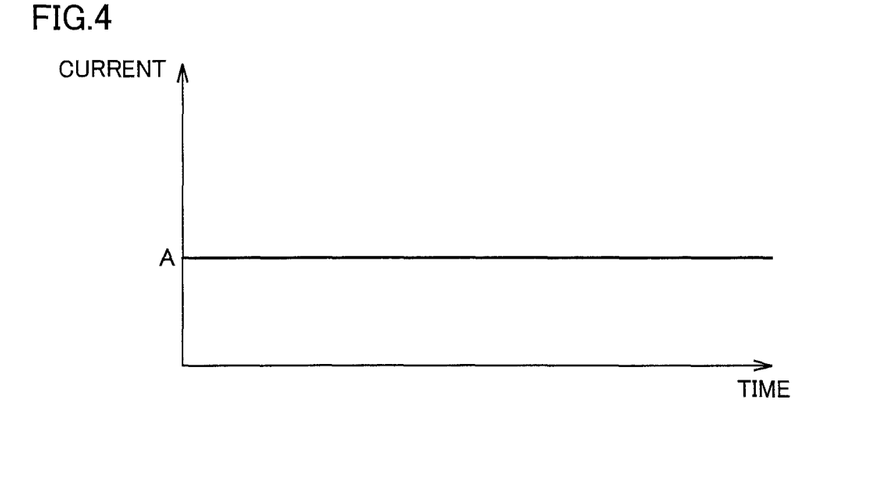
FIG. 4 is a diagram for illustrating the loss in the case where standby power supply 14 shown in FIG. 2 operates steadily.

When standby power supply 14 continuously operates (for example, when electric power is continuously supplied to the standby circuit included in load circuit 2), loss constantly occurs in standby power supply 14. Specifically, as shown in FIG. 4, the current having a current value A constantly flows through standby power supply 14.

Figure 5:
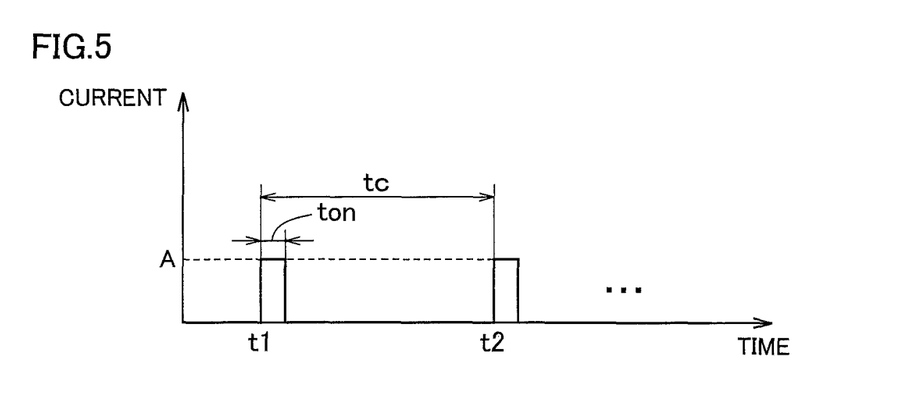
FIG. 5 is a diagram for illustrating the effect according to the embodiment of the present invention.

FIG. 5 is a diagram for illustrating the effect according to the embodiment of the present invention. Referring to FIG. 5, in the embodiment of the present invention, standby power supply 14 is basically stopped in the state where load circuit 2 does not need to be supplied with electric power from power supply 3 (the second mode). Standby power supply 14 is started only for charging power storage device 15. Therefore, standby power supply 14 is intermittently started.

For example, as shown in FIG. 5, standby power supply 14 is started at a time t1 and a time t2. A time period tc represents a time period from time t1 to time t2, and shows the starting cycle of standby power supply 14. A time period ton shows the operation time period of standby power supply 14 per startup. According to the present embodiment, while the current value is represented as A, for example, only during time period ton, the current value averaged in terms of time is significantly smaller than current value A. Therefore, according to the present embodiment, the loss of standby power supply 14 can be reduced.

Furthermore, in the second mode, no loss occurs in main power supply 13 since main power supply switch 12 is turned off. Therefore, in the state where load circuit 2 is in the second mode, the loss of power supply 3 can be suppressed.

Figure 6:
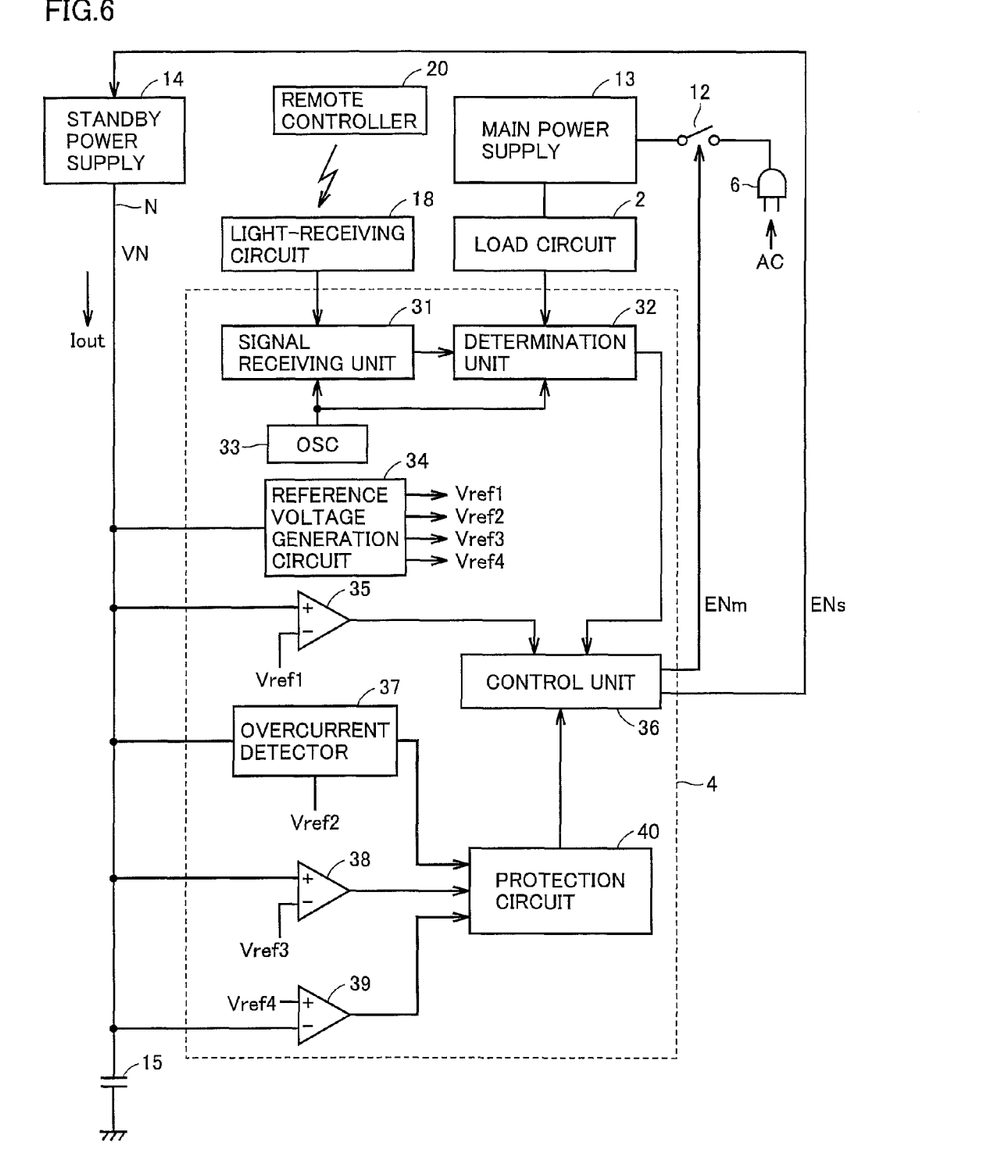
FIG. 6 is a block diagram showing the configuration of a power supply control device 4 according to the present embodiment.

Power supply control device 4 according to the present embodiment can be implemented by a semiconductor integrated circuit. FIG. 6 is a block diagram showing the configuration of a power supply control device 4 according to the present embodiment.

Referring to FIG. 6, power supply control device 4 includes a signal receiving unit 31, a determination unit 32, an oscillation circuit (OSC) 33, a reference voltage generation circuit 34, a comparator 35, a control unit 36, an overcurrent detector 37, an overvoltage detector 38, an undervoltage detector 39, and a protection circuit 40.

Signal receiving unit 31 receives, from light-receiving circuit 18, the power-on signal transmitted from remote controller 20 to light-receiving circuit 18. Signal receiving unit 31 transmits the signal indicating that the power-on signal has been received to determination unit 32. Determination unit 32 determines based on the signal from signal receiving unit 31 that the mode of load circuit 2 has been changed from the standby mode to the normal operation mode. On the other hand, when the mode of load circuit 2 is changed from the normal operation mode to the standby mode, load circuit 2 outputs the signal indicating this change to determination unit 32. In response to the signal from load circuit 2, determination unit 32 determines that the mode of load circuit 2 has been changed from the normal operation mode to the standby mode. Determination unit 32 transmits the signal showing the determination result to control unit 36.

Oscillation circuit 33 supplies, for example, to signal receiving unit 31 and determination unit 32, the control signal for controlling the operation of each of these units. It is to be noted that the signal from oscillation circuit 33 may be supplied not only to signal receiving unit 31 and determination unit 32 but also to other circuits such as control unit 36.

Reference voltage generation circuit 34 generates reference voltages Vref1, Vref2, Vref3, and Vref4 based on voltage VN output from node N. For example, reference voltage generation circuit 34 is configured of a bandgap circuit. Reference voltage generation circuit 34 may generate reference voltages Vref1 to Vref4 separately or may generate reference voltages Vref1 to Vref4 by dividing a reference voltage by a resistance voltage dividing circuit.

Comparator 35 compares voltage VN with reference voltage Vref1 and outputs the comparison result to control unit 36. When voltage VN is greater than reference voltage Vref1, comparator 35 outputs an H (high) level signal to control unit 36. On the other hand, when voltage VN falls below reference voltage Vref1, comparator 35 outputs an L (low) level signal. The value of reference voltage Vref1 is equivalent to the lower limit value within the range of the operating voltage of power supply control device 4.

Overcurrent detector 37 generates a voltage in proportion to a current Iout output from standby power supply 14 and compares this voltage with reference voltage Vref2. When the voltage proportional to current Iout is greater than reference voltage Vref2, overcurrent detector 37 outputs an H level signal to protection circuit 40.

Overvoltage detector 38 compares voltage VN with reference voltage Vref3 and outputs the comparison result to protection circuit 40. When voltage VN is greater than reference voltage Vref3, overvoltage detector 38 outputs an H level signal to protection circuit 40.

Undervoltage detector 39 compares voltage VN with reference voltage Vref4 and outputs the comparison result to protection circuit 40. When voltage VN falls below reference voltage Vref4, undervoltage detector 39 outputs an H level signal to protection circuit 40.

Control unit 36 controls main power supply switch 12 and standby power supply 14 to be started/stopped. When determination unit 32 determines that the mode of load circuit 2 has been changed from the standby mode to the normal operation mode, control unit 36 transmits a signal ENm to main power supply switch 12 to cause main power supply switch 12 to turn on. Furthermore, control unit 36 transmits a signal ENs to standby power supply 14. Gate control circuit 25 included in standby power supply 14 (see FIG. 3) starts the switching control of MOSFET 24 in response to signal ENs. Consequently, power supply 3 is started.

When determination unit 32 determines that the mode of load circuit 2 is changed from the normal operation mode to the standby mode, control unit 36 transmits signal ENm for turning off main power supply switch 12 to main power supply switch 12, and also transmits signal ENs for stopping standby power supply 14 to standby power supply 14. Main power supply switch 12 is turned off in response to signal ENm while gate control circuit 25 included in standby power supply 14 stops in response to signal ENs.

Furthermore, in response to the H level signal transmitted from comparator 35, control unit 36 transmits signal ENs to standby power supply 14 so as to start standby power supply 14. Gate control circuit 25 starts the switching control of MOSFET 24 in response to signal ENs. By starting standby power supply 14, the capacitor as power storage device 15 is charged. After completion of charging of the capacitor, control unit 36 transmits signal ENs to standby power supply 14 so as to stop standby power supply 14.

When a malfunction occurs in standby power supply 14 or in a capacitor, for example, Iout becomes excessively large or voltage VN becomes excessively large or excessively small. When Iout is excessively large, an H-level signal is output from overcurrent detector 37. Similarly, when voltage VN is excessively large, an H-level signal is output from overvoltage detector 38, and when voltage VN is excessively small, an H-level signal is output from undervoltage detector 39. When an H-level signal is output from at least one of overcurrent detector 37, overvoltage detector 38 and undervoltage detector 39, protection circuit 40 transmits the signal indicating a malfunction occurring in the power supply system to control unit 36. In response to this signal, control unit 36 transmits signal ENm for controlling main power supply switch 12 to main power supply switch 12. Furthermore, protection circuit 40 stops the operation of power supply control device 4.

For example, in response to the signal from protection circuit 40, control unit 36 transmits signal ENm for turning off main power supply switch 12 to main power supply switch 12. In this case, since load circuit 2 and power supply system 1 are stopped, electronic device 100 can be protected. It is to be noted that control unit 36 may transmit signal ENm for turning on main power supply switch 12 to main power supply switch 12. In this case, even when a malfunction occurs in a standby power supply system, the function of load circuit 2 corresponding to a main body of electronic device 100 can be maintained.

Figure 7:
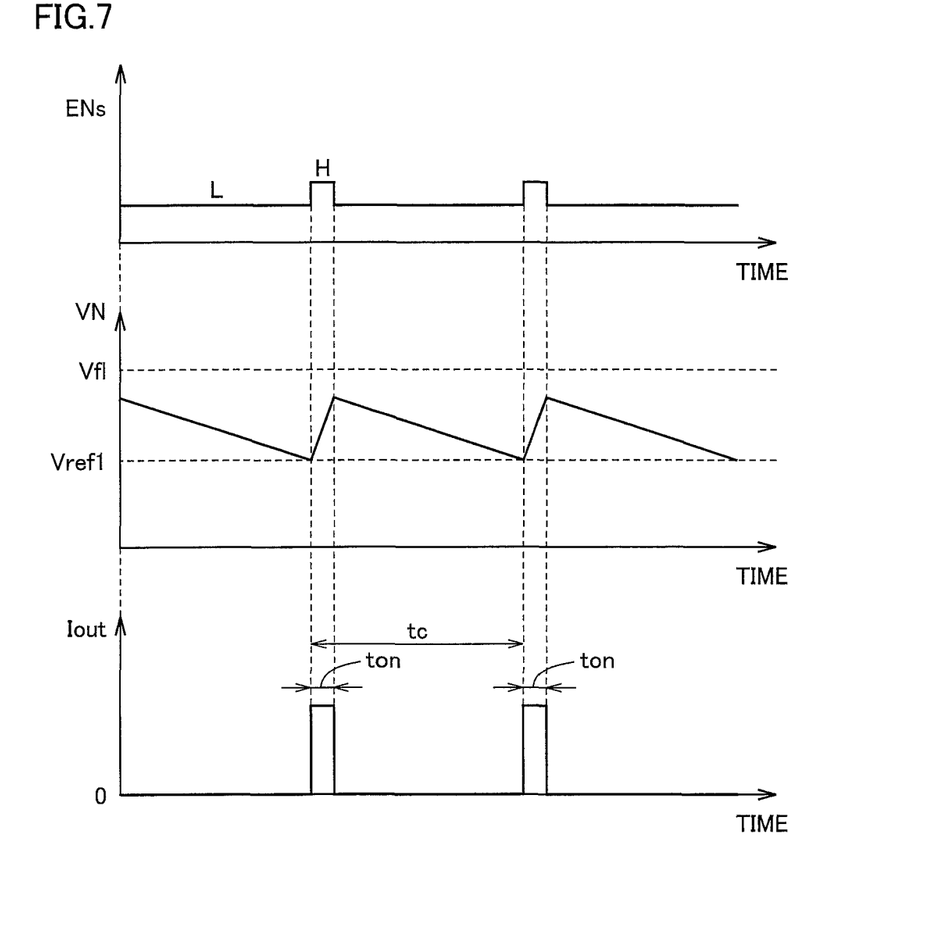
FIG. 7 is a waveform diagram showing the operation of power supply control device 4 having the configuration shown in FIG. 6.

FIG. 7 is a waveform diagram showing the operation of power supply control device 4 having the configuration shown in FIG. 6. Referring to FIGS. 7 and 6, voltage VN is controlled to be greater than reference voltage Vref1 and to be not more than a voltage Vfl. Preferably, voltage VN is controlled to be less than voltage Vfl. In this case, voltage Vfl is equivalent to voltage VN of the capacitor in the fully charged state.

Since power supply control device 4 consumes the electric power stored in the capacitor, voltage VN gradually decreases. When voltage VN reaches reference voltage Vref1, that is, the lower limit value within the range of the operating voltage, power supply control device 4 changes the level of signal ENs from the L level to the H level. Consequently, current Iout is output from standby power supply 14. Current Iout is output from standby power supply 14, so that the capacitor is charged and voltage VN is increased.

Current Iout flows during time period ton. After a lapse of time period ton, power supply control device 4 changes the level of signal ENs from the H level to the L level. Consequently, standby power supply 14 is stopped and charging of the capacitor is completed. Then, when voltage VN reaches reference voltage Vref1, power supply control device 4 again changes the level of signal. ENs from the L level to the H level.

In the present embodiment, time period ton representing the operation time period of standby power supply 14 is constant. For example, control unit 36 has a timer function and measures time period ton. Time period ton is defined in advance based on the efficiency of standby power supply 14, as will be described below.

Figure 8:
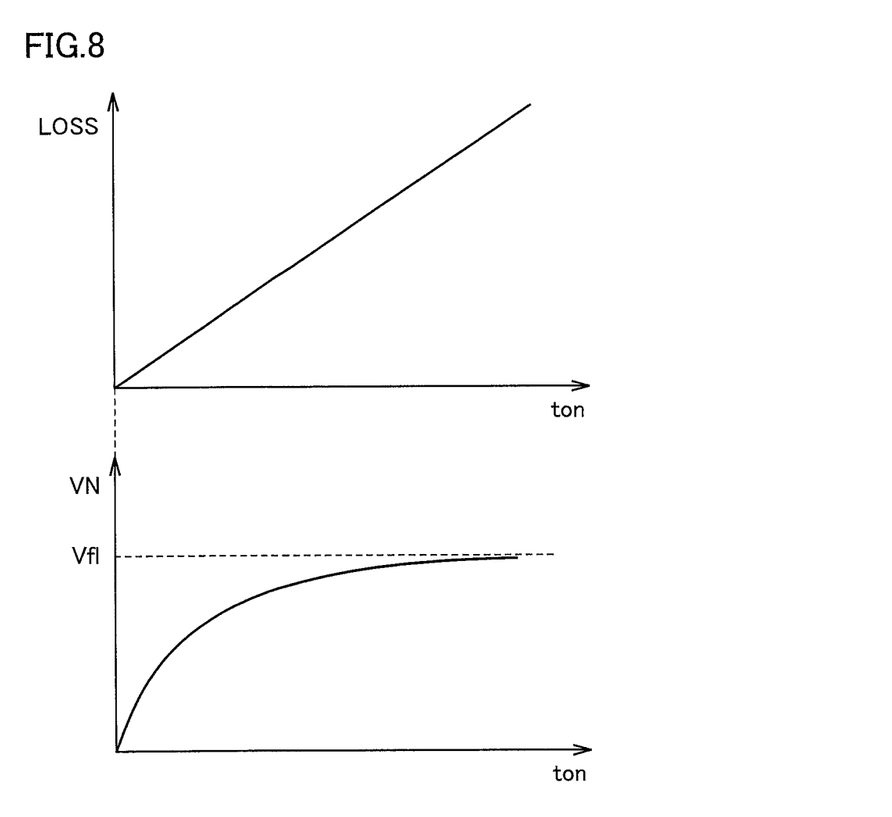
FIG. 8 is a diagram showing the relationship between the startup time (time period ton) of standby power supply 14 and the loss of standby power supply 14.

FIG. 8 is a diagram showing the relationship between the startup time (time period ton) of standby power supply 14 and the loss of standby power supply 14. Referring to FIG. 8, the loss of standby power supply 14 increases monotonically with respect to time period ton. For example, the loss of standby power supply 14 is in proportion to time period ton.

Assuming that current Iout is constant, the time rate of change of the voltage of the capacitor (that is, voltage VN) is relatively high at the start of charging of the capacitor, but is gradually decreased. Although the voltage of the capacitor approaches voltage Vfl, the voltage of the capacitor in the fully charged state hardly changes even if the charging time period is lengthened. On the other hand, the loss of the standby power supply is increased by lengthening the charging time period.

Figure 9:
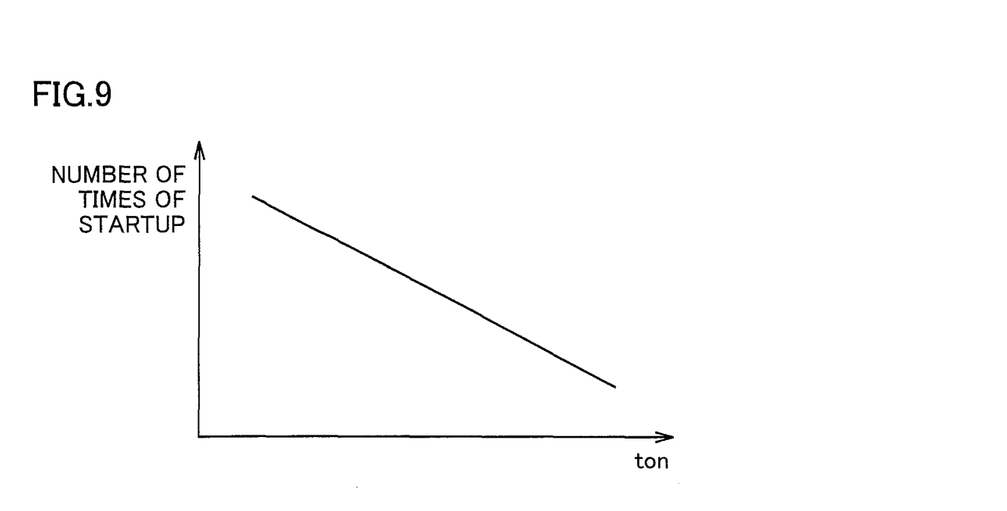
FIG. 9 is a diagram showing the relationship between the startup time (time period ton) of standby power supply 14 and the number of times of starting standby power supply 14 per unit time.

FIG. 9 is a diagram showing the relationship between the startup time (time period ton) of standby power supply 14 and the number of times of starting standby power supply 14 per unit time. Referring to FIG. 9, the shorter time period ton is, the shorter the charging time period of the capacitor is. When the charging time period of the capacitor is relatively short, the electric power stored in the capacitor is relatively reduced. Accordingly, the number of times of starting standby power supply 14 per unit time is increased.

Since the discharge time period of the capacitor is shortened due to an increase in number of times of starting standby power supply 14, the time period during which standby power supply 14 is stopped is shortened. Accordingly, the reduction amount of the loss of standby power supply 14 is decreased.

Figure 10:
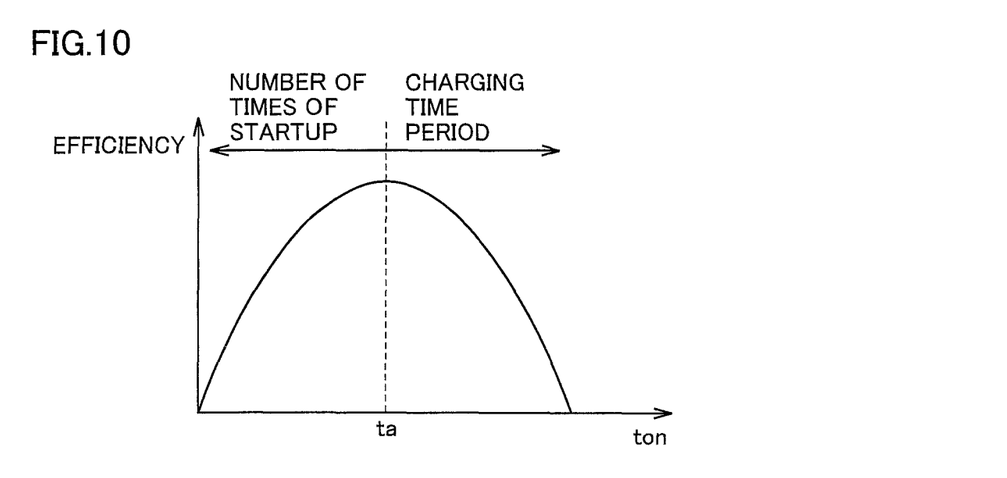
FIG. 10 is a diagram showing the relationship between the efficiency of standby power supply 14 and the startup time (time period ton) of standby power supply 14.

As shown in FIGS. 8 and 9, there is a trade-off relationship between the loss of standby power supply 14 and the number of times of starting standby power supply 14. Therefore, as shown in FIG. 10, standby power supply 14 achieves the maximum efficiency at ton=ta. The maximum efficiency of standby power supply 14 means that the amount of the loss reduction caused by stopping standby power supply 14 is the maximum.

When time period ton is longer than time period ta, the charging time period of the capacitor is lengthened, which causes an increases in the loss of standby power supply 14. Furthermore, due to the shortened time period during which standby power supply 14 is stopped, the reduction amount of the loss of standby power supply 14 is decreased. This results in a decrease in the efficiency of standby power supply 14.

On the other hand, when time period ton is shorter than time period ta, the loss of standby power supply 14 occurring in each startup is decreased. However, the number of times of starting standby power supply 14 is increased, which leads to a decrease in the reduction amount of the loss of standby power supply 14. Consequently, the efficiency of standby power supply 14 is decreased.

It is to be noted that time period ton may be variable. Furthermore, control unit 36 may control the starting cycle of standby power supply 14 (the length of time period tc) based on the past history. For example, when the atmosphere temperature of the capacitor is relatively high, the reduction amount of the electric charges stored in the capacitor is greater than that in the case where the atmosphere temperature of the capacitor is relatively low. Therefore, control unit 36 may study the time interval of charging operations for the capacitor and may also change the length of time period ton or the length of time period tc based on the study results.

Figure 11:
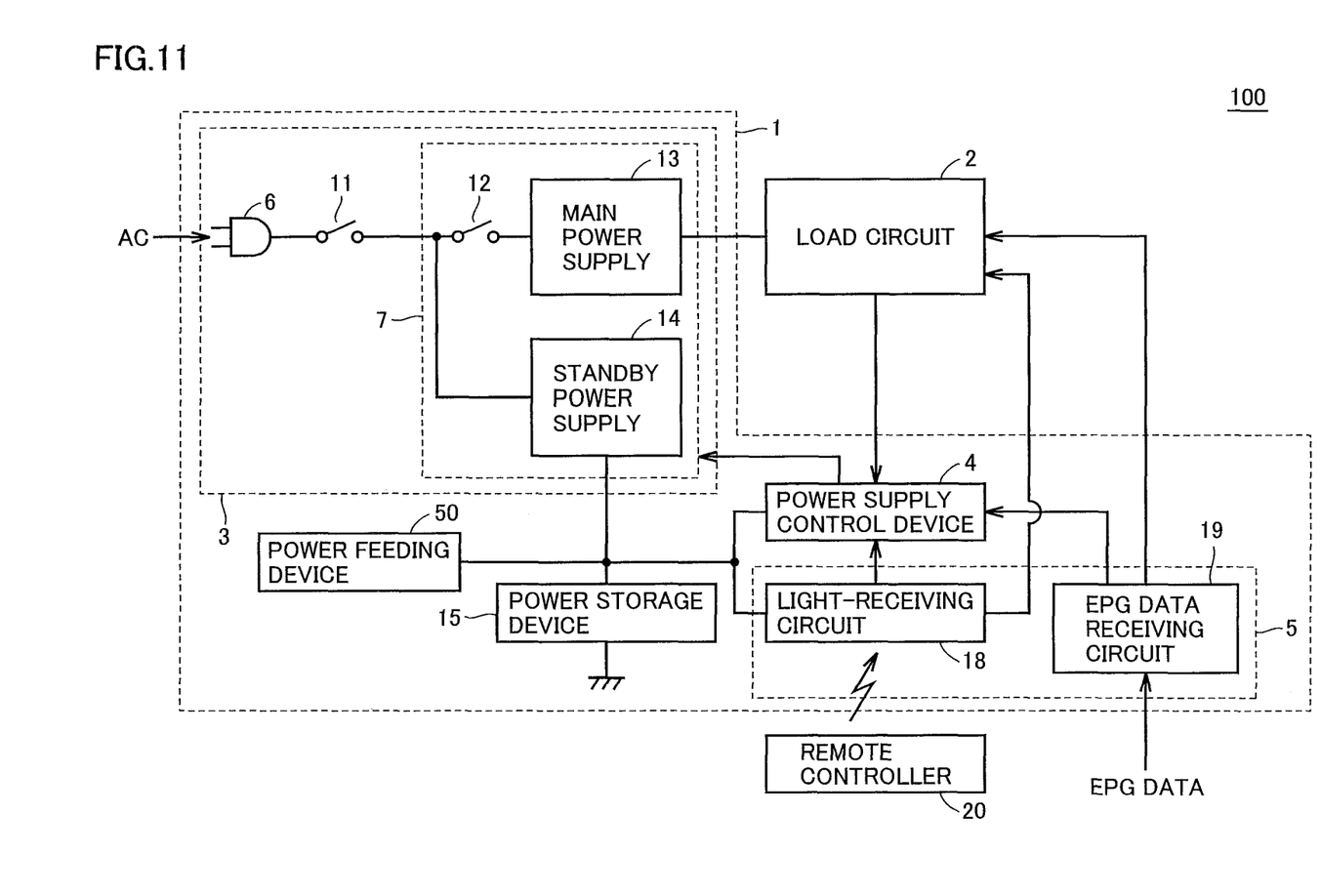
FIG. 11 is a block diagram showing the configuration of a modification of an electronic device 100 according to the embodiment of the present invention.

In the above-described embodiment, power storage device 15 and power supply control device 4 are configured so as to receive the electric power only from standby power supply 14. However, the configuration of the power supply system according to the present embodiment is not limited thereto. For example, as shown in FIG. 11, power supply system 1 may include a power feeding device 50 for feeding electric power to power storage device 15 and power supply control device 4.

The configuration of power feeding device 50 is not particularly limited as long as the electric power can be supplied to power storage device 15 and power supply control device 4. Power feeding device 50 is, for example, a power generation device such as a solar cell, a power storage device such as a battery or a capacitor, a device for receiving electric power from a device other than electronic device 100 like a USB (Universal Serial Bus) interface circuit, or the like. When power feeding device 50 is in the state where it can supply electric power to power supply control device 4, it becomes unnecessary for power supply control device 4 to intermittently start standby power supply 14. Therefore, it becomes possible to further reduce the loss of the power supply system occurring while load circuit 2 is in the standby mode.

As described above, according to the present embodiment, the power supply control device causes the power supply to stop when the mode of the load circuit is switched from the mode in which electric power needs to be supplied from the power supply to the mode in which the electric power does not need to be supplied from the power supply. Consequently, the loss of the power supply can be reduced.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 power supply system, 2 load circuit, 3 power supply, 4 power supply control device, 5 startup signal generation circuit, 6 plug, 7 AC/DC converter, 11 mechanical switch, 12 main power supply switch, 13 main power supply, 14 standby power supply, 15 power storage device, 18 light-receiving circuit, 19 EPG data receiving circuit, 20 remote controller, 21 rectifier circuit, 22, 27 smoothing capacitor, 23 transformer, 23A primary winding, 23B secondary winding, 24 MOSFET, 25 gate control circuit, 26 diode, 28 photo coupler, 28A light-emitting diode, 28B phototransistor, 29 zener diode, 31 signal receiving unit, 32 determination unit, 33 oscillation circuit, 34 reference voltage generation circuit, 35 comparator, 36 control unit, 37 overcurrent detector, 38 over-

The invention claimed is:

1. A power supply control device for controlling a power supply comprising a main power supply for supplying power to a load circuit and a standby power supply,
said load circuit being capable of mutually switching between a first state in which electric power needs to be supplied from said main power supply and a second state in which electric power does not need to be supplied from said main power supply,
said power supply control device comprising:
a determination unit for determining a change of a state of said load circuit between said first state and said second state; and
a control unit for causing said main power supply to stop when said determination unit determines that said first state is changed to said second state,
wherein the standby power supply has a node to which an output end of an output voltage of the standby power supply, a power storage device and the power supply control device are connected in common,
the power supply control device receives electric power from the node,
after the main power supply is stopped due to the change of the load circuit from the first state to the second state, the power storage device supplies electric power to the node, and
the control unit controls starting and stopping of the standby power supply in accordance with a comparison result of the output voltage of the standby power supply with a reference voltage, and thereby, the control unit intermittently starts up the power supply in order to resupply the electric power to the power storage device.

2. The power supply control device according to claim 1, wherein said control unit starts up said main power supply for supplying the electric power to said load circuit when said determination unit determines that said second state is changed to said first state.

3. The power supply control device according to claim 1, wherein said power supply control device controls an operation time period of said standby power supply at a time when the standby power supply is intermittently started such that a voltage of said node is greater than a lower limit value in a range of an operating voltage of said power supply control device and equal to or less than a voltage of said power storage device in a fully charged state.

4. A power supply system comprising:
a power supply including a main power supply for supplying electric power to a load circuit and a standby power supply,
said load circuit being capable of mutually switching between a first state in which electric power needs to be supplied from said main power supply and a second state in which electric power does not need to be supplied from said main power supply,
said power supply system further comprising:
a power supply control device for controlling said power supply,
said power supply control device including
a determination unit for determining a change of a state of said load circuit between said first state and said second state, and
a control unit for causing said power supply to stop when said determination unit determines that said first state is changed to said second state,
wherein the standby power supply has a node to which an output end of an output voltage of the standby power supply, a power storage device and the power supply control device are connected in common,
the power supply control device receives electric power from the node,
after the main power supply is stopped due to the change of the load circuit from the first state to the second state, the power storage device supplies electric power to the node, and
the control unit controls starting and stopping of the standby power supply in accordance with a comparison result of the output voltage of the standby power supply with a reference voltage, and thereby, the control unit intermittently starts up the power supply in order to resupply the electric power to the power storage device.

5. An electronic device comprising:
a power supply including a main power supply and a standby power supply;
a load circuit configured to be capable of mutually switching between a first state in which electric power needs to be supplied from said main power supply and a second state in which electric power does not need to be supplied from said main power supply; and
a power supply control device for controlling said power supply,
said power supply control device including
a determination unit for determining a change of a state of said load circuit between said first state and said second state, and
a control unit for causing said power supply to stop when said determination unit determines that said first state is changed to said second state,
wherein the standby power supply has a node to which an output end of an output voltage of the standby power supply, a power storage device and the power supply control device are connected in common,
the power supply control device receives electric power from the node,
after the main power supply is stopped due to the change of the load circuit from the first state to the second state, the power storage device supplies electric power to the node, and
the control unit controls starting and stopping of the standby power supply in accordance with a comparison result of the output voltage of the standby power supply with a reference voltage, and thereby, the control unit intermittently starts up the power supply in order to resupply the electric power to the power storage device.

* * * * *